B. K. MALTBY.
Apparatus for Raising the Grates in Cooking Stoves.
No. 7,442.
Patented June 18, 1850.
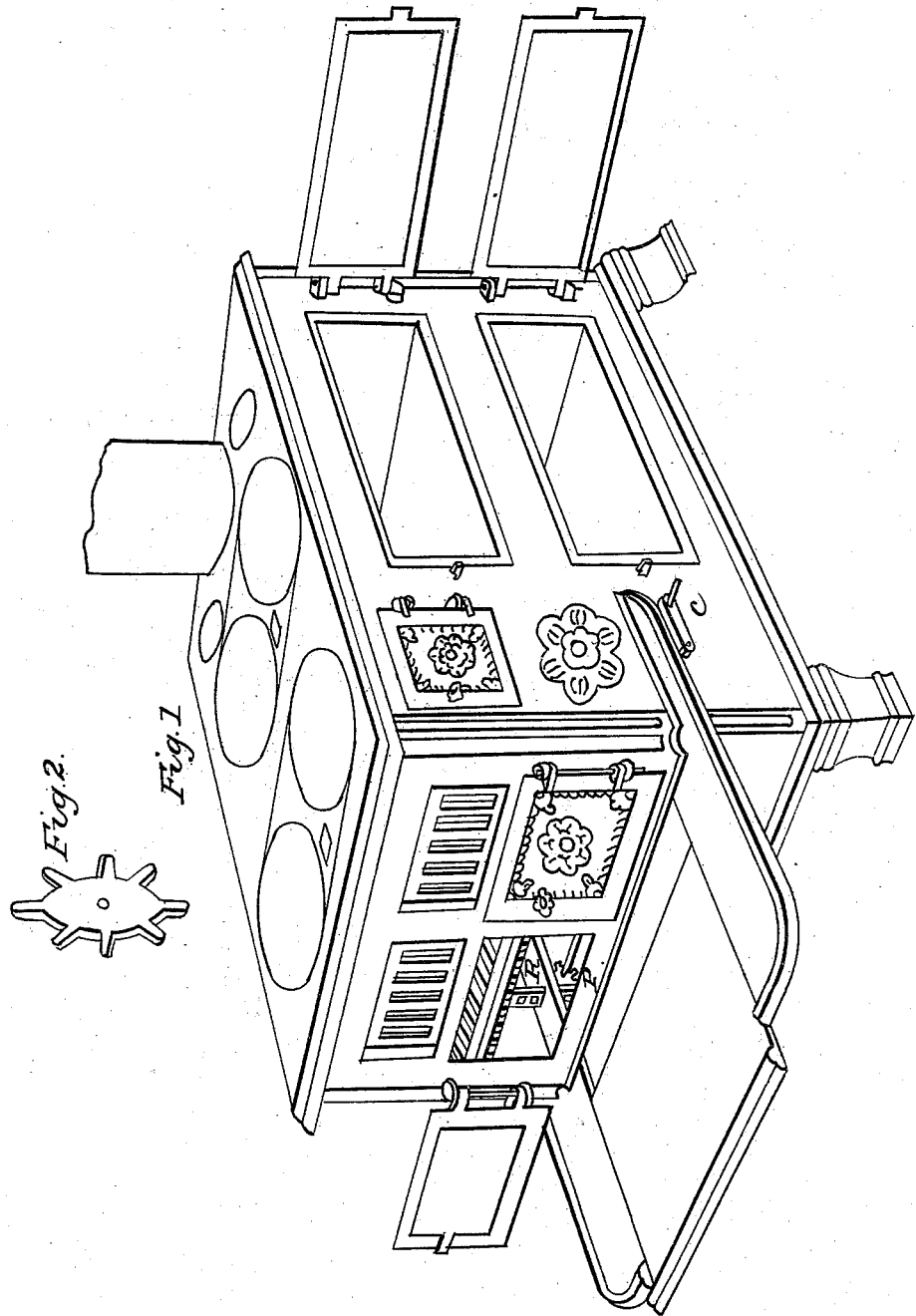

UNITED STATES PATENT OFFICE.

BENJ. K. MALTBY, OF CLEVELAND, OHIO, ASSIGNOR TO J. M. MEAD, OF MOGADORE, OHIO.

APPARATUS FOR RAISING THE GRATE IN COOKING-STOVES.

Specification of Letters Patent No. 7,442, dated June 18, 1850.

*To all whom it may concern:*

Be it known that I, BENJ. K. MALTBY, of Cleveland, in the county of Cuyahoga and State of Ohio, have invented a new and useful Improvement in Cooking-Stoves; and I do hereby declare that the following is a full and exact description of the same, reference being had to the accompanying drawings, and to the letters of reference marked thereon, in which—

Figure 1, is a representation of the stove as a whole showing its external form, ovens, fire-place, and the rising and falling grate with the rack and pinion constituting the apparatus for raising or lowering the same. Fig. 2, is a representation of the wheel or pinion but imperfectly seen Fig. 1, at the letter P.

In Fig. 1, the letter G, is the fire grate movable up and down to vary the depth and capacity of the fire place. Letter R, marks the rack or sliding piece situated at each end of the grate to receive the action of the two pinions. The perforations shown in the drawings at R, are a contrivance to receive the action of the cogs of the pinion which protrude sufficiently to force out any obstruction tending to accumulate there by the presence of baking of ashes, &c. C marks the crank terminating the shaft or rod on which the two pinions are situated and turn by its motion.

In Fig. 2 B, marks the beveled or sharpened space between the cogs of the pinions so contrived as to prevent ashes accumulating or baking there.

What I claim as my invention and desire to secure by Letters Patent is—

The apparatus for lowering and raising the grate, so constructed as to act without liability to obstruction from the baking of ashes between the parts of the machinery, having sliding pieces or racks furnished with perforations instead of cogs in combination with pinions acting upon them by cogs said pinions having the spaces between the cogs beveled bringing them to a kind of edge, thus admitting no flat spaces to intervene where ashes may accumulate to prevent the working of the machinery.

BENJ. K. MALTBY.

Witnesses:
JOHN L. SMITH,
GEO. P. JUDSON.